United States Patent [19]
Gavin

[11] Patent Number: 5,778,058
[45] Date of Patent: Jul. 7, 1998

[54] METHOD OF ADDING A NEW PBX AND NEW PBX PORT TO AN EXISTING PBX NETWORK

[75] Inventor: John Christopher Gavin, Maplewood, N.J.

[73] Assignee: Timeplex, Inc., Woodcliff, N.J.

[21] Appl. No.: 726,631

[22] Filed: Oct. 7, 1996

[51] Int. Cl.⁶ .................................................. H04M 7/06
[52] U.S. Cl. ...................... 379/225; 379/207; 379/219; 379/231; 379/234; 370/254; 370/400
[58] Field of Search .................... 379/225, 219, 379/220, 221, 207, 229, 230, 231, 232, 233, 234, 93.07, 100.12, 198; 370/254, 255, 256, 400

[56] References Cited

U.S. PATENT DOCUMENTS

| | | | |
|---|---|---|---|
| 4,488,004 | 12/1984 | Bogart et al. | 379/225 |
| 4,661,974 | 4/1987 | Bales et al. | 379/225 |
| 5,084,870 | 1/1992 | Hutchison et al. | 370/258 |
| 5,138,615 | 8/1992 | Lamport et al. | 370/400 |
| 5,307,465 | 4/1994 | Iki | 395/311 |
| 5,430,730 | 7/1995 | Sepulveda-Garese et al. | 370/254 |
| 5,444,694 | 8/1995 | Millet et al. | 370/224 |
| 5,450,408 | 9/1995 | Phell | 370/256 |
| 5,495,479 | 2/1996 | Galaand | 370/404 |
| 5,506,838 | 4/1996 | Flanagan | 370/258 |
| 5,513,171 | 4/1996 | Ludwiczak et al. | 370/254 |
| 5,513,313 | 4/1996 | Bruck et al. | 395/182.02 |
| 5,521,972 | 5/1996 | Iki | 379/221 |
| 5,526,358 | 6/1996 | Gregerson et al. | 395/200.51 |
| 5,533,016 | 7/1996 | Cook et al. | 370/351 |
| 5,590,120 | 12/1996 | Vaishnavi et al. | 370/254 |

*Primary Examiner*—Ahmad F. Matar
*Assistant Examiner*—Scott Wolinsky
*Attorney, Agent, or Firm*—Irwin Ostroff; Edward Brandeau

[57] ABSTRACT

There is provided a method of adding a new private branch exchange interface (PBX port) to a data communication network having a number of existing PBX ports, each coupled to respective ones of data transport nodes for sending and receiving via high speed data links (e.g., T-1 lines) customer data to each of the other nodes. A network management system computer having a database is coupled to the network. The method of adding a new PBX port includes the steps of: determining with the aid of the computer database a suitable address for the new PBX port; determining with the aid of the computer database a correct address of a selected one of the existing PBX ports; searching the database for all other addresses of existing PBX ports to which the selected one PBX port is connected and compiling a list of such other addresses; and establishing a direct dedicated channel ("frame relay channel") for communication between the address of the new PBX port and each one of the addresses of the existing PBX ports such that PBXs connected to the respective PBX ports are able to communicate directly with any of the new and existing PBXs via the data network and its nodes.

6 Claims, 3 Drawing Sheets

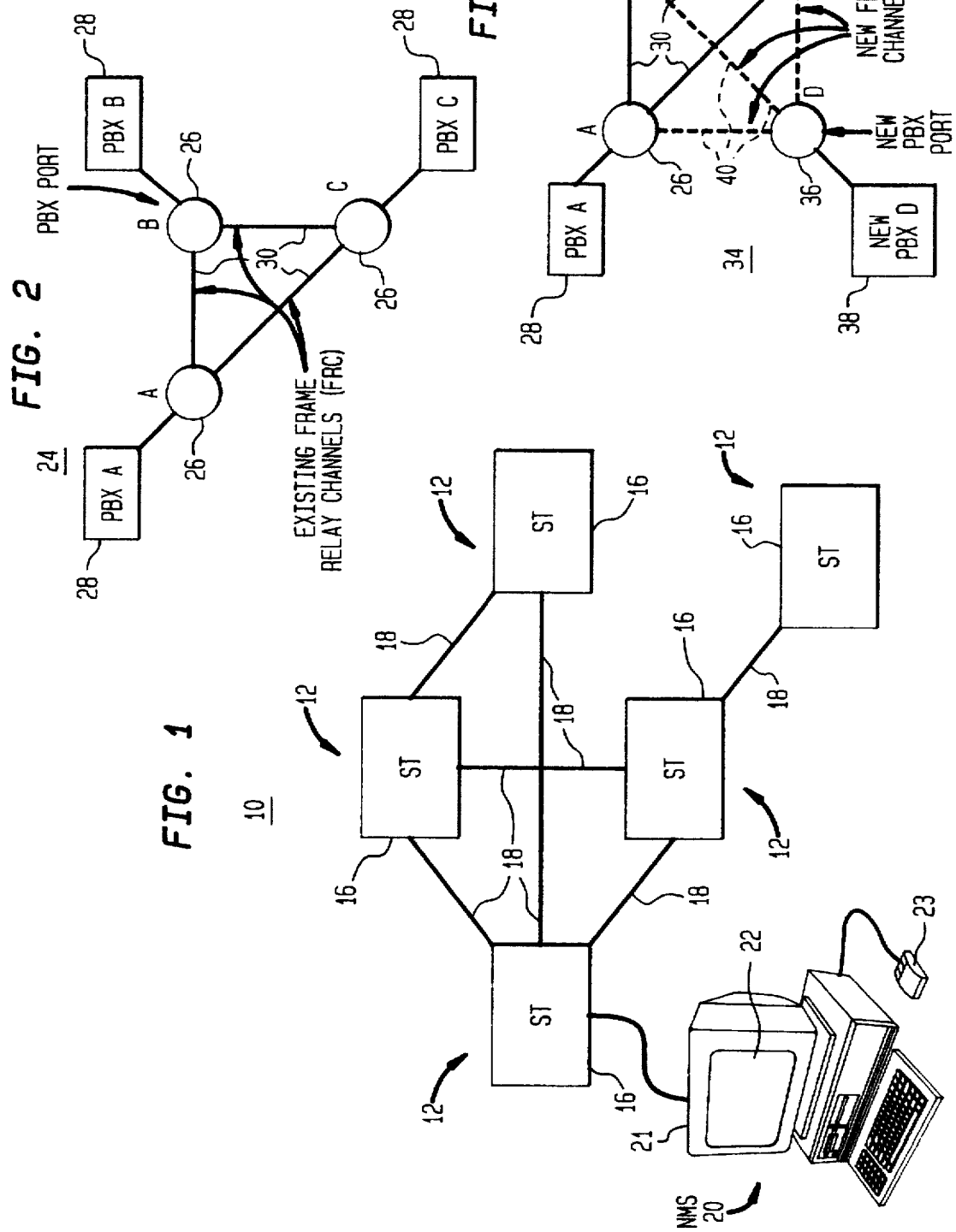

METHOD OF ADDING A NEW PBX AND NEW PBX PORT TO AN EXISTING PBX NETWORK

FIELD OF THE INVENTION

This invention relates to a method of establishing dedicated logical connections, also termed "frame relay channels", between a newly added port or physical interface in a data communications network and those already so connected in the network.

BACKGROUND OF THE INVENTION

Companies, such as banks, insurance companies, etc., generate masses of information which in the course of business they must frequently transmit, in the form of electronic digital data, from one office location to another, often at great distance (e.g., New York to London). The cost of transmitting such data becomes very high unless the data is efficiently multiplexed and then transmitted in a cost effective way over a high speed communication link (e.g., a leased "T-1" telephone line operating at 1.544 megabits per second).

Ascom Timeplex, Inc., manufactures and sells to a worldwide market digital data transmission equipment under the tradename "Synchrony". This equipment takes advantage of the latest in digital data technology. Synchrony data transport equipment (hereinafter referred to as "ST") multiplexes or packages a customer's digital data at one location and transmits the data at high speed in a cost-effective way to any location the customer desires to communicate with by taking best advantage of existing communications links, such as "T-1" lines, satellite links, etc.

A customer, who is already using a Synchrony network for data transmission, often has its own telephone PBXs (private branch exchanges) at various office locations. It is highly desirable from the standpoint of cost savings that telephone calls also be routed from PBX to PBX via the Synchrony network rather than over a commercial telephone network (e.g., AT&T).

The capability of routing telephone calls through a Synchrony network is provided by a unit within an "ST" node termed a "D-channel Server Module" (DSM) associated with a port, termed a PBX port to which a respective PBX is connected. Each PBX is served exclusively by one PBX port. The PBX communicates with the PBX port in order to place calls through the ST network to another PBX, and in order to receive such calls.

The PBX is physically attached to an "ST" node's Input/Output port ("I/O port") by means of a cable. The "I/O port" is programmed to provide communications between the PBX and the PBX port. The I/O port may or may not be in the same ST node as the PBX port.

When a new PBX port and PBX are added to the network of PBX ports and PBXs it is necessary, in order that the newly added PBX be able to communicate directly with already interconnected PBXs, to establish a permanently dedicated logical connection termed a "frame relay channel" (FRC) between the new PBX port and each of the existing PBX ports. In other words, there must be a permanent FRC from the new PBX port to every other PBX port supporting the various PBXs. This arrangement of frame relay channels (FRCs) is termed a "full mesh". Where there are only two PBX ports only one FRC is required; for four PBX ports, six FRCs are needed; where there are ten PBX ports, there are needed forty-five FRCs, and twenty PBX ports need 190 FRCs, and so on in an ever expanding progression.

In the absence of the invention, when a new PBX port (supporting a new PBX) is added to an existing Synchrony network, the necessary FRCs have to be established manually one at a time. This is not much of a burden when only a few PBX ports are involved. But the task of establishing FRCs becomes time consuming and tedious with larger numbers of PBX ports (e.g., ten, or twenty, or more). Moreover, considerable care is required not to miss establishing a required FRC, or to needlessly duplicate already existing FRCs.

It is desirable to have a method which greatly facilitates in time and effort the establishing of all of the needed FRCs between all of the existing PBX ports and a newly added PBX port without omission and without duplication.

SUMMARY OF THE INVENTION

In accordance with the invention there is provided a method of adding a new private branch exchange interface (PBX port) to a data communication network having a number of existing interfaces (PBX ports).

The network comprises a plurality of nodes each of which comprises a data transport for sending and receiving customer data at high speed to each of the other nodes. The nodes are interconnected with each other by high speed data links (e.g., T-1 lines). The network is administered by a network management system computer having a database. Each node may have contained in it one or more of the existing PBX ports (each connected to its associated PBX). The method of adding a new PBX port comprises the steps of: manually determining with the aid of the computer database a suitable address for the new PBX port; manually determining with the aid of the computer database a correct address of an arbitrarily selected one of the existing PBX ports; instructing the computer to search the database for all other addresses of existing PBX ports to which the existing selected PBX port is connected and to compile a list of such other addresses; and instructing the computer to establish a set of direct dedicated channels ("frame relay channels") for communication between the address of the new PBX port and each one of the addresses of the existing PBX ports, such that PBXs connected to the respective existing ports are able to communicate directly with the new PBX via the data network and its nodes.

In accordance with another aspect of the invention there is provided a method of adding a private branch exchange (PBX) and associated new interface PBX port to a data communications network having a plurality of PBXs already connected at respective existing interface PBX ports of the network and able to communicate directly from PBX to PBX via the network. The method comprises steps of determining from a computer database of the network a suitable address within the network of PBX ports for the new PBX port being added; determining from the database a correct address of any one of the existing PBX ports already connected to the network; compiling from the database all additional addresses of existing PBX ports connected to the existing one PBX port; forming new address-pairs of the new PBX port and each one of the existing PBX ports; and establishing for each new address-pair a direct dedicated communication channel such that the new and existing PBXs connected at respective PBX ports of the network can communicate via the network directly with each other.

Viewed from another aspect, the present invention is directed to a method of adding a new private branch exchange interface (PBX port) to a data communication network having a number of existing PBX ports. The network comprises a plurality of nodes each of which includes a data transport for sending and receiving customer data at high speed to each of the other nodes. The nodes are interconnected with each other by high speed data links. The network is administered by a network management system computer having a database. The existing PBX ports are connected to respective ones of the nodes. The method comprises the steps of: manually determining with the aid of the computer database a suitable address for the new PBX port; manually determining with the aid of the computer database a correct address of a selected, arbitrary one of the existing PBX ports; instructing the computer to search the database for all other addresses of existing PBX ports to which the selected one PBX port is connected and to compile a list of such other addresses; and instructing the computer to establish a respective direct dedicated channel for communication between the address of the new PBX port and each one of the addresses of the existing PBX ports such that PBXs connected to the respective PBX ports are able to communicate directly with any of the new and existing PBXs via the data network and its nodes.

Viewed from still another aspect, the present invention is directed to a method of adding a new private branch exchange interface (PBX port) to a data communications network having a number of existing PBX ports. The network has a plurality of nodes each of which comprises a data transport for sending and receiving customer data at high speed to each of the other nodes. The nodes are interconnected with each other by high speed data links. The network is administered by a network management system computer having a database. Each of the PBX ports is connected to a respective one of the nodes. Each of the PBX ports has a respective multi-part address including an address of a node in which it is contained. The method comprises the steps of: manually determining with the aid of the system computer a suitable multi-part address for the new PBX port and storing the new address in memory; manually determining with the aid of the system computer a correct multi-part address for a selected, arbitrary one of the existing PBX ports and storing the selected one PBX port address in memory; instructing the system computer to search the database and to compile existing addresses of all other PBX ports which are coupled via the network to the existing selected PBX port; and instructing the system computer to establish a set of dedicated frame relay channels for communication between the address of the new PBX port and the addresses of each one of existing PBX ports, such that a PBX connected to any PBX port can communicate via the network of nodes to any PBX connected to any of the other PBX ports.

A better understanding of the invention will best be gained from the following description given in conjunction with the accompanying drawings.

BRIEF DESCRIPTION OF THE DRAWINGS

FIG. 1 is a schematic block diagram showing a data transmission network of interconnected "ST" (Synchrony transport) nodes and a network management computer system (ST-NMS) useful in the method of the invention;

FIG. 2 is a schematic block diagram of a portion of the network of FIG. 1 showing existing DSM (D-channel server module) PBX ports associated with an "ST" unit (not shown) and showing separate PBXs connected to the respective ports;

FIG. 3 is a schematic block diagram of the PBX ports of FIG. 2 indicating how a new or additional PBX port and its associated DSM and PBX are interconnected into the network of FIG. 1;

DETAILED DESCRIPTION

Figure 4:
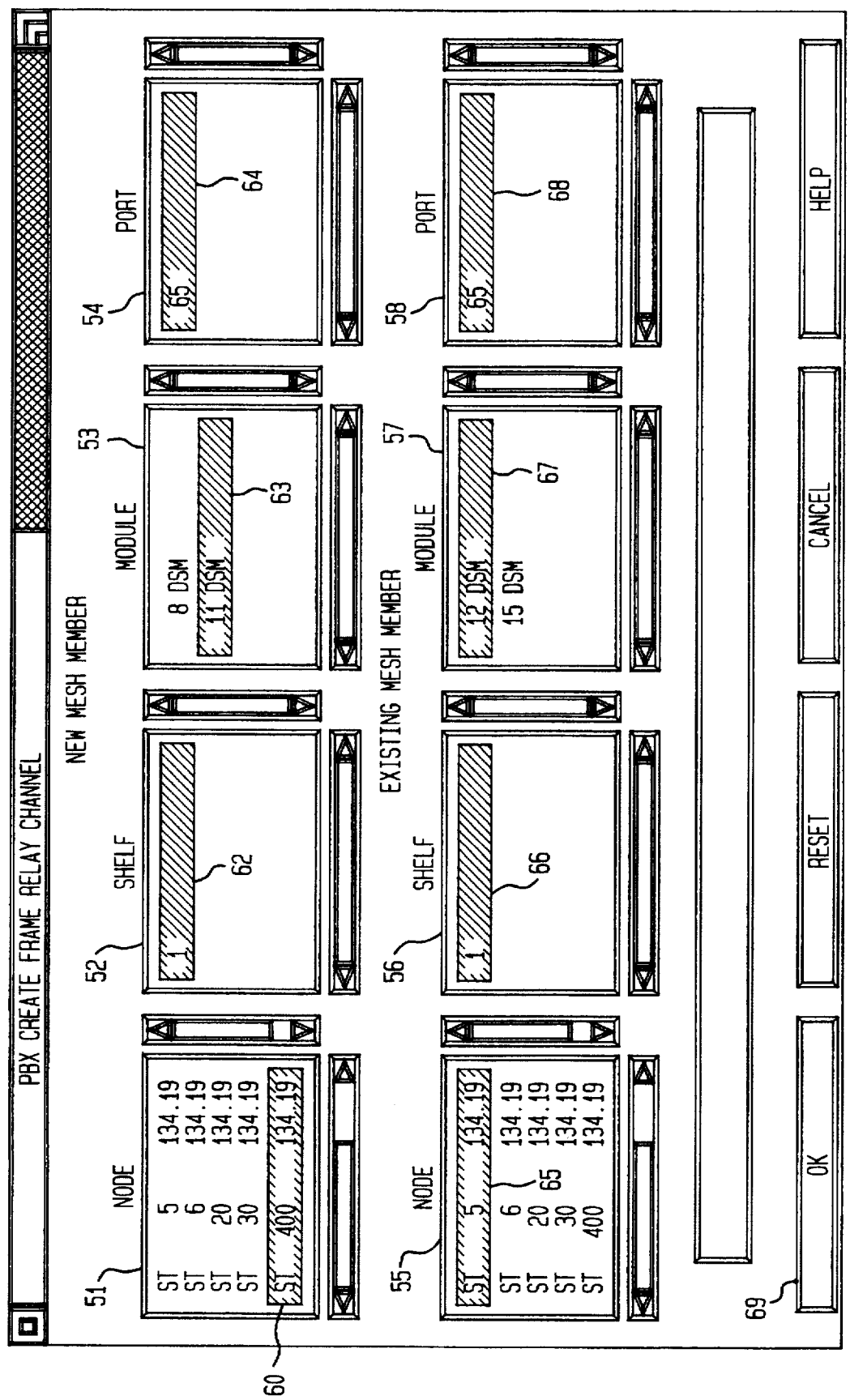
FIG. 4 is a schematic illustration of an image produced on a monitor screen of the ST-NMS of FIG. 1 illustrating steps in the method provided by the present invention.

Referring now to FIG. 1, there is shown a schematic block diagram of a data transmission network 10. The network 10 comprises a number of nodes 12 of Synchrony Transport equipment (ST) shown within a respective solid-line box 16, interconnecting data paths 18, and a network management system (ST-NMS) 20. There may be more or fewer nodes 12 in the network 10 than the five shown here. Each node 12 with its respective ST 16 is connected to one or more of the others via one of the respective data transmission paths 18 which can be a "T-1" telephone line, satellite link, etc. Each ST 16 may contain one or more PBX ports (not shown in FIG. 1 but shown in FIG. 2) to which can be connected user equipment such as a PBX. Each ST 16 multiplexes data fed into it from its ports and transmits the data at high speed at best efficiency to another ST 16 via a respective data path 18, or the data may be passed through a series of ST 16 units, and their respective data paths 18, before reaching the destination ST 16. A receiving ST 16 demultiplexes the data received and applies it to a selected port or ports. The network management system 20 comprises a computer 21 (having a keyboard), a monitor 22, and a mouse 23.

Referring now to FIG. 2, there is schematically illustrated a network (mesh) 24 representing a portion of the network 10 (nodes 12 not being shown here). In the network 24 are illustratively shown three D-channel server module (PBX) ports 26 designated "A", "B" and "C". Each PBX port 26 has connected to it a respective PBX 28, designated here PBX "A", PBX "B" and PBX "C". Each of the PBX ports 26 is connected to each of the others via respective ones of frame relay channels (FRCs) 30 to be described in greater detail hereinafter. It is to be understood that though a ST 16 at a node 12 is not shown here, the PBX ports 26 are distributed among one or more such ST 16 units, which in turn are interconnected via the high speed paths 18 (see FIG. 1).

Referring now to FIG. 3, there is shown a network (mesh) 34 otherwise identical to the network 24 (FIG. 2) but having an additional PBX port 36, designated "D", an additional PBX 38, designated PBX "D", and as indicated by dotted lines, additional frame relay channels (FRCs) 40 which must be established to connect the new PBX port 36 to each of the existing PBX ports 26. In essence, a new PBX port 36 and a new PBX 38 have been added to the combination shown in FIG. 2. It is to be understood that there may be a larger number of existing PBX ports 26 (e.g., ten, or twenty, or more) than the three shown here by way of example. How the FRC channels 40 (and 30) are established in accordance with a method the present invention will now be described.

Referring now to FIG. 4, there is shown a schematic illustration of an image 50 as same would appear on the monitor 22 of the network management system computer 21 of FIG. 1. Information provided by the computer 21 in the image 50 (as stored in a database memory of the computer 21) is sequentially shown under a heading "new mesh member" in respective boxes 51–54 of FIG. 4, and under a heading "existing mesh member" in respective boxes 55–58 of FIG. 4. This information, as will be explained, represents the "addresses" or locations of Synchrony nodes (e.g., nodes 12 of FIG. 1) and respective DSMS and their ports (e.g., PBX ports 26 and 36 of FIG. 3).

As seen in the box 51 of the image 50, there are listed by way of example "ST" nodes numbered "5", "6", "20", "30", and "400". Initially the boxes 52 through 58 are empty and blank. None of the "ST" nodes within the box 51 is as yet highlighted. The image 50 FIG. 4 also shows PBX CREATE FRAME RELAY CHANNEL, RESET, CANCEL, and HELP within respective separate rectangular boxes.

A human operator of the computer 21 knows from a systems plan or map of the Synchrony network 10 (FIG. 1) and the network 34 (FIG. 3) that the ST node associated with the new PBX port 36 (designated "D") is number 400. Accordingly, the operator instructs the computer 21 via the mouse 23 to select or "highlight" the node 400 (as shown by the shaded area 60 in the box 51). After doing this the computer 21 then shows in the next box 52 that ST node 400 has only a single "shelf" numbered "1" available.

This shelf 1 represents a first (and only) shelf location in this example within an equipment rack of the ST node 400. The operator accordingly selects shelf 1 which the computer then highlights as a shaded area 62 in the box 52. Next, as is shown in the box 53, the computer monitor image 50 shows two DSM modules numbered "8" and "11" to be available. In this example the operator selects DSM "11" which is accordingly highlighted by a shaded area 63. Finally, as is shown in the box 54, the computer 21 shows that there is only one port numbered "65" available. Accordingly, the operator selects this port 65 as indicated by a shaded area 64.

Still referring to FIG. 4, the image 50 shows under the heading "existing mesh number" in a box 55 the same ST node numbers as shown in the box 51. ST node numbered 400 has now been designated as part of the "address" of the newly added PBX port 36 as was explained previously. Accordingly, it is now necessary for the operator to determine an address for an existing PBX port 26, either "A", "B" or "C" (FIG. 3). The operator determines from the network system map that, by way of example, an "ST" node numbered "5" appears to be associated with the existing PBX port 26, designated PBX port "A" (see FIG. 3). The operator therefore selects ST node numbered 5 in the box 55. The computer 21 thereupon highlights this node, as indicated by a shaded area 65, and then shows in the next box 56 a shelf "1". Since this is the only choice available, the operator selects shelf 1 which is then highlighted, as indicated by a shaded area 66. Then, in the next box 57, the computer 21 lists two available DSMS, numbers "12" and "15". By way of example, the operator selects DSM number 12 which is thereupon highlighted, as indicated by a shaded area 67.

Had the selection of DSM 12 been an impermissible choice, the number "12" DSM would not have been offered in the box 57. However, the choice of DSM 12 is correct and in the next box 58 there is shown availability of a port numbered "65". Since this is the only choice, the operator selects it as indicated by the shaded area 68. An "OK" button 69 (shown at the bottom left of the screen 50) becomes operative, and the user now selects it by means of the mouse 23.

It will be understood from the above description that considerable skill and knowledge is required on the part of the operator in selecting an address for the new PBX port 36 (port "D") and in determining a correct address for an existing PBX port 26 (e.g., port "A"). This process also partly involves trial and error by the operator in assembling permissible segments of the addresses. Accordingly, a fair amount of time and care is involved just in determining one address-pair.

After having correctly determined the addresses of the address-pair: "new PBX port "D"-existing PBX port A", the selection of the "OK" button 69 by the operator then instructs the computer 21 to search the database for all address-pairs in which the address of the existing PBX port 26 just identified (in this example, PBX port "A" of FIG. 3) appears. In this search (following the example given) the computer will identify the two address-pairs of: PBX port "A"-PBX port "B"; and PBX port "A"-PBX port "C" of FIG. 3 (but not the address-pair: PBX port "B"-PBX port "C"). Once the search is completed (in a second or so) the full set of existing PBX ports is identified. Now that new PBX port "D" and existing PBX ports "A", "B", and "C" are identified, the computer 21 concludes that three new FRCs are required.

Because a PBX port is involved in several FRCs (a separate FRC to each of the other PBX ports), there is an additional level of addressing, called a Data Link Connection Identifier (DLCI), which uniquely identifies an FRC within a PBX port, much as an apartment number uniquely identifies a residence within an apartment house. Therefore, the computer will now search its database to find available DLCIs, analogous to empty apartments. It identifies, in this example, three available DLCIs for PBX Port "D", one for PBX Port "A", one for PBX Port "B", and one for PBX Port "C". Thus, three new address-pairs are formed; D-A, D-B, and D-C, with no omissions. In our example, the D-A address pair happens to use DLCI #3 on PBX Port "D", and DLCI #3 on PBX Port "A".

Next, it is desirable to eliminate any duplicate FRC, in case PBX Port "D" was not completely new. Therefore, the computer 21 searches its database again, this time looking for any existing FRC which would be the same as any of the new address-pairs, considering only the PBX ports involved, and ignoring the specific DLCIs. Finding any such FRCs causes the computer 21 to drop the corresponding new address-pair. In our example, PBX Port "D" is completely new, so all three address-pairs are retained.

Thus all of the address-pairs required for the new FRC channels 40 (FIG. 3) are accurately and easily obtained, without omission and without duplication. This greatly simplifies the adding of a new PBX port (i.e., PBX port D) to the network 34, especially where a sizable number (e.g., ten, or twenty, or more) of PBX ports are involved.

Next, the computer 21 forms tentative FRCs in its own memory, one for each valid address-pair from the preceding processing. The computer thereafter removes the image 50 from the monitor 22, and displays an image 70, as is described below.

Figure 5:
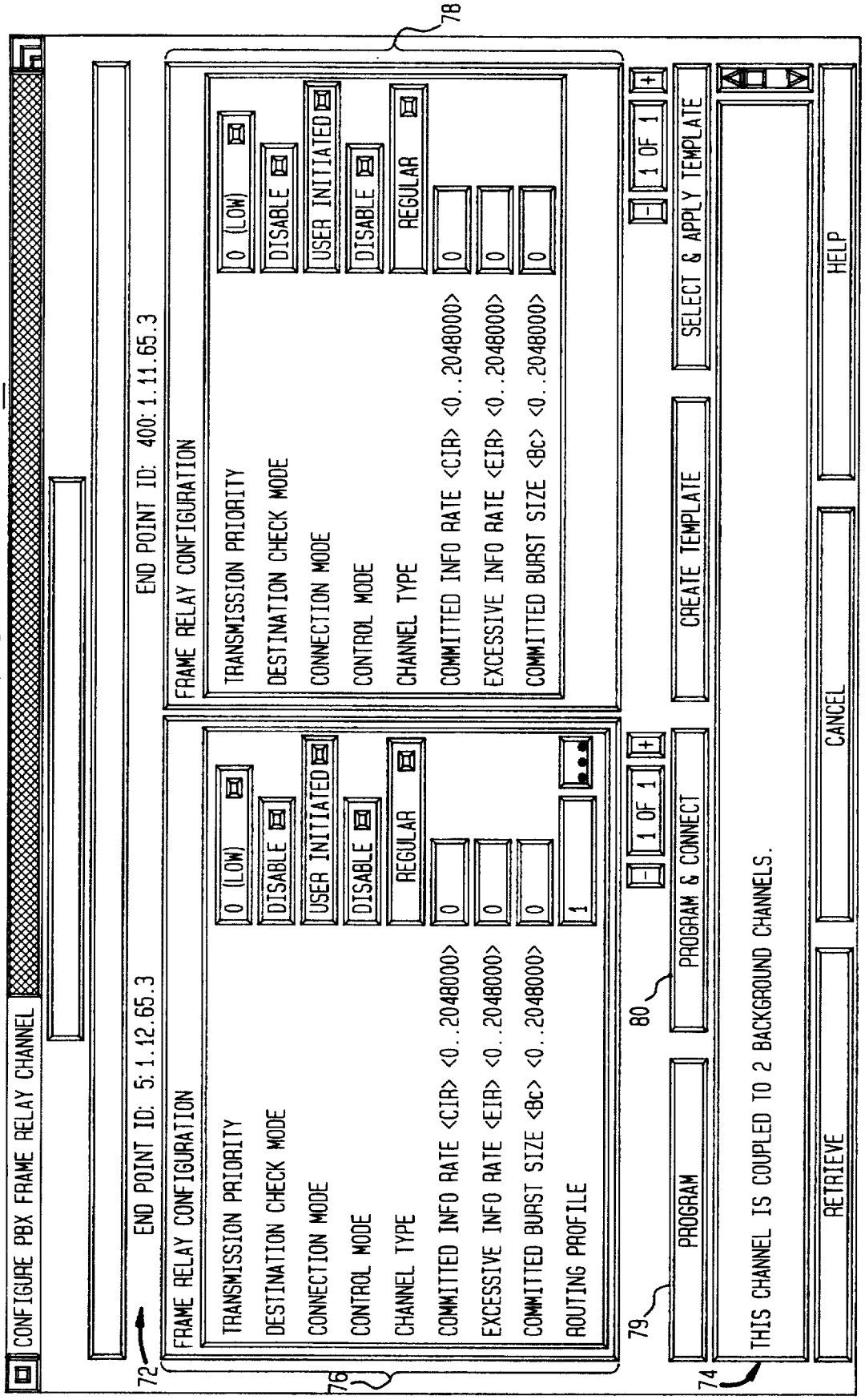
FIG. 5 is a schematic illustration of another image produced on a monitor screen of the ST-NMS in accordance with the present invention.

Referring now to FIG. 5, there is shown a schematic illustration of a subsequent image 70 as it appears on the monitor 22 of the computer 21 of FIG. 1. The image 70 is provided by the computer 21 subsequent to the image 50 and after a first address-pair: new PBX port "D"-existing PBX port "A" has been established. The image 70 in an upper horizontal row indicated at 72 shows the respective addresses of the DLCIs on PBX port "A" and PBX port "D" as "End Point ID: 5.1.12.65.3" and "End Point ID: 400.1.11.65.3", as previously identified.

The image 70 in a lower horizontal row indicated at 74 states "THIS CHANNEL IS COUPLED TO 2 BACKGROUND CHANNELS". This of course refers to the other two address-pairs: new PBX port "D"-PBX port "B", and new PBX port "D"-PBX port "C". The image 70 provides the operator with two sets of configuration options titled "FRAME RELAY CONFIGURATION" one of which is indicated at 76, and the other at 78. The image 70 of FIG. 5 also shows CONFIGURE PBX FRAME RELAY CHANNEL, CREATE TEMPLATE, SELECT & APPLY TEMPLATE, RETRIEVE, CANCEL, AND HELP within separate rectangular boxes.

The operator selects from among the various options listed the characteristics of a frame relay channel (FRC) to be established between the address-pair shown in the row 72, namely: existing PBX port "A"—new PBX port "D". After selection is complete, the operator so signals the computer 21, by selecting either a "Program" button 79 or a "Program and Connect" button 80, whereupon a respective FRC, with selected characteristics, is established between the address-pairs listed in the row 72 of the image 70, as well as the two address-pairs indicated in the row 74.

In this way the respective FRCs 40 illustrated in FIG. 3 are permanently established in the ST network 10 and stored in the computer database for use whenever called. The newly added PBX 38, designated PBX "D" (see FIG. 3) is now able to communicate directly with each and every existing PBX 28 over the partial Synchrony network 34 and the complete Synchrony network 10 (FIG. 1) of which the network 34 is a part.

The above description is to be understood as given in illustration and not in limitation of the invention. Various changes or modifications in the method of the invention as set forth may occur to those skilled in the art, and these may be made without departing from the spirit and scope of the invention as defined by the accompanying claims.

What is claimed is:

1. A method of adding a new private branch exchange (PBX) and associated new interface PBX port to a data communications network having a plurality of PBXs already connected at respective existing interface PBX ports of the network and able to communicate directly from PBX to PBX via the network, the method comprising to steps of:
   determining from a computer database of the network a suitable address within the network of PBX ports for the new PBX port being added;
   determining from the database a correct address of one of the existing PBX ports already connected to the network;
   compiling from the database all additional addresses of existing PBX ports connected to the existing one PBX port;
   forming new address-pairs of the new PBX port and each one of the existing PBX ports; and
   establishing for each new address-pair a direct dedicated communication channel such that the new and existing PBXs connected at respective PBX ports of the network can communicate via the network directly with each other.

2. A method of adding a new private branch exchange interface (PBX port) to a data communications network having a number of existing PBX ports, the network comprising a plurality of nodes each of which includes a data transport for sending and receiving customer data at high speed to each of the other nodes, the nodes being interconnected with each other by high speed data links, the network being administered by a network management system computer having a database, the existing PBX ports being connected to respective ones of the nodes, the method comprising the steps of:

manually determining with the aid of the computer database a suitable address for the new PBX port;
manually determining with the aid of the computer database a correct address of a selected arbitrary one of the existing PBX ports;
instructing the computer to search the database for all other addresses of existing PBX ports to which the selected one PBX port is connected and to compile a list of such other addresses; and
instructing the computer to establish a respective direct dedicated channel for communication between the address of the new PBX port and each one of the addresses of the existing PBX ports such that PBXs connected to the respective PBX ports are able to communicate directly with any of the new and existing PBXs via the data network and its nodes.

3. The method of claim 2 further comprising the steps of determining the transmission characteristics of each direct dedicated channel by selecting from a menu of features the desired characteristics of the direct dedicated channel, and applying such features to each direct dedicated channel when it is established.

4. A method of adding a new private branch exchange interface (PBX port) to a data communications network having a number of existing PBX ports, the network having a plurality of nodes each of which comprises a data transport for sending and receiving customer data at high speed to each of the other nodes, the nodes being interconnected with each other by high speed data links, the network being administered by a network management system computer having a database, each of the PBX ports being connected to a respective one of the nodes, each of the PBX ports having a respective multi-part address including an address of a node to which it is connected, the method comprising the steps of:
manually determining with the aid of the system computer a suitable multi-part address for the new PBX port and storing the new address in memory;
manually determining with the aid of the system computer a correct multi-part address for a selected arbitrary one of the existing PBX ports and storing the selected one PBX port address in memory;
instructing the system computer to search the database and to compile existing addresses of all other PBX ports which are coupled via the network to the existing selected PBX port; and
instructing the system computer to establish a set of dedicated frame relay channels for communication between the address of the new PBX port and the addresses of each one of existing PBX ports, such that a PBX connected to any PBX port can communicate via the network of nodes to any PBX connected to any of the other PBX ports.

5. The method of claim 4 further comprising the steps of manually selecting with the aid of the system computer desired characteristics of each dedicated frame relay channel, and instructing the computer to establish the direct dedicated frame relay channels with these desired characteristics.

6. A method of adding a new private branch exchange (PBX) and associated new interface PBX port to a data communications network having a plurality of PBXs already connected at respective existing interface PBX ports of the network and able to communicate directly from PBX to PBX via the network, the method comprising to steps of:
determining from a computer database of the network a suitable address within the network of PBX ports for the new PBX port being added;

determining from the database a correct address of any one of the existing PBX ports already connected to the network;

compiling from the database all additional addresses of existing PBX ports connected to the existing one PBX port;

forming new address-pairs of the new PBX port and each one of the existing PBX ports;

establishing for each new address-pair a direct dedicated communication channel; and searching the database for any existing direct dedicated communication channel the same as that for any of the new address-pairs and eliminating any duplicate channel if found such that a direct dedicated communication channel is established for each new address-pair without omission and without duplication, and the new and existing PBXs connected at respective PBX ports of the network can communicate via the network directly with each other.

* * * * *